United States Patent [19]

Popeney

[11] 4,416,406
[45] Nov. 22, 1983

[54] VEHICLE LUGGAGE CARRIER

[76] Inventor: Harry V. Popeney, 18136-45 Oxnard St., Tarzana, Calif. 91356

[21] Appl. No.: 329,289

[22] Filed: Dec. 10, 1981

[51] Int. Cl.³ .............................................. B60R 9/04
[52] U.S. Cl. ................................... 224/314; 224/315; 224/322; 224/324; 224/325
[58] Field of Search ............... 224/309, 314, 315, 319, 224/322, 324, 325, 326; 248/223.4, 224.1–224.4, 248/225.1, 222.1, 222.3; 414/462; 24/217 R

[56] References Cited

U.S. PATENT DOCUMENTS

| 3,542,264 | 11/1970 | Meyer | 224/326 X |
| 4,222,508 | 9/1980 | Bott | 224/324 |
| 4,295,587 | 10/1981 | Bott | 224/322 X |
| 4,358,037 | 11/1982 | Heideman | 224/324 X |

FOREIGN PATENT DOCUMENTS

| 814207 | 3/1937 | France | 224/324 |
| 471194 | 5/1952 | Italy | 224/325 |
| 1306216 | 2/1973 | United Kingdom | 224/324 |

Primary Examiner—William Price
Assistant Examiner—Gary E. Elkins
Attorney, Agent, or Firm—John J. Posta, Jr.

[57] ABSTRACT

Improvements are provided in a vehicle having a luggage carrier connected to a luggage supporting surface. The improvements comprise a luggage rack assembly having a spaced parallel pair of horizontally attending raised side rails slideably disposed in parallel rail tracks secured to the luggage supporting surface. The assembly also has a spaced parallel pair of horizontally extending rack sub assemblies disposed between the side rails. Each sub assembly has an elongated horizontal rack track and an elongated horizontal luggage retainer keyed to the track and moveable between a flat, collapsed horizontal storage position and an operative raised luggage engirdling position spaced above the track. The luggage retainer is slideably secured to the rack track and includes a first portion having a plurality of hingedly interconnected longitudinally extending plates, including a telescoping middle plate and two end plates, one of which is hinged or otherwise secured to track or a fixed second portion of the retainer. The first portion may be releasably locked to the second portion. When unlocked, it can be swung into an inverted U-shape extending around luggage above the second portion and with the unhinged free end thereof locked to the second portion. In one embodiment, one end of the interconnected plates can be pivoted horizontally so that the plates can be swung to bridge the space between the two rack tracks and interconnect the same.

8 Claims, 6 Drawing Figures

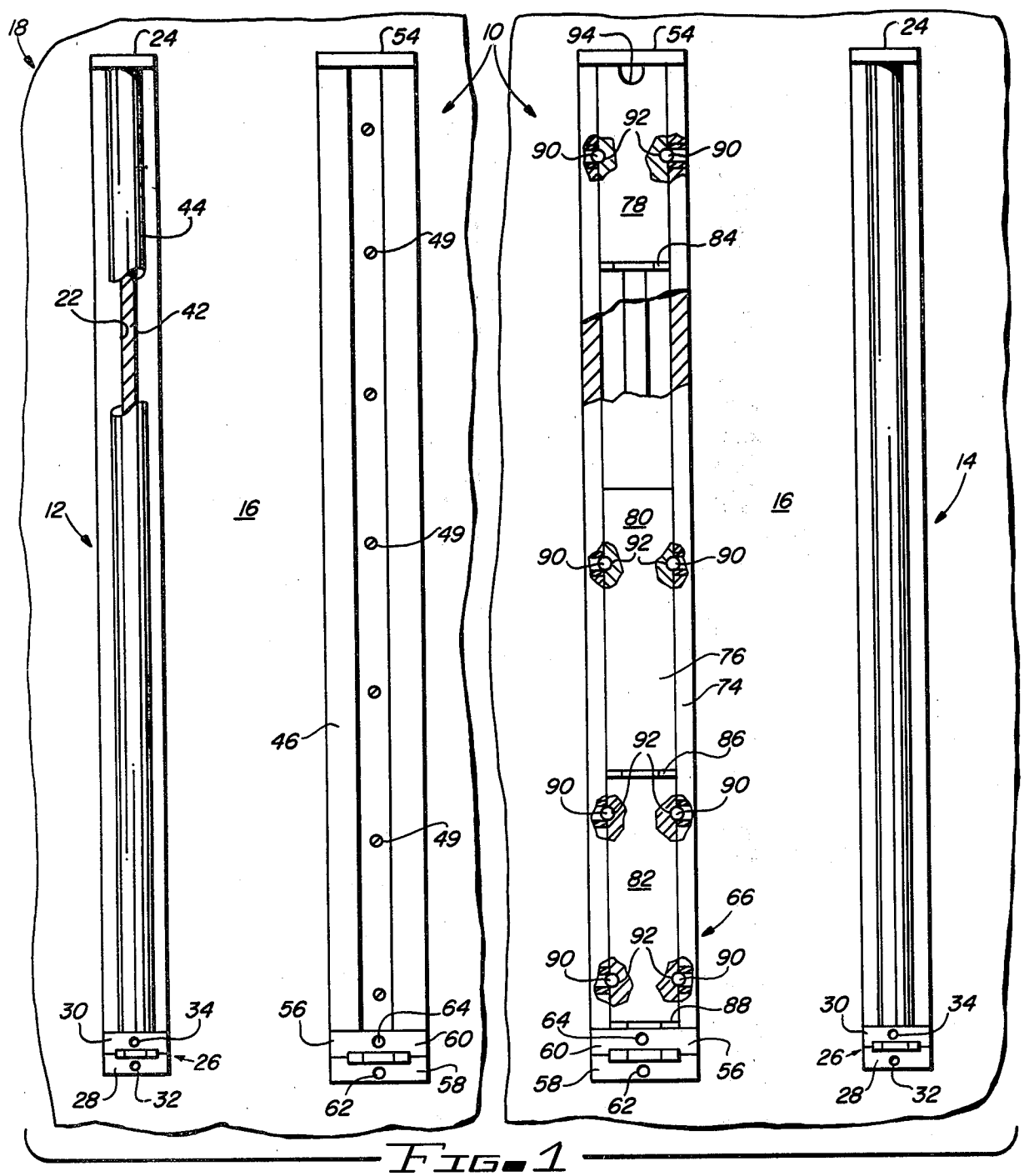
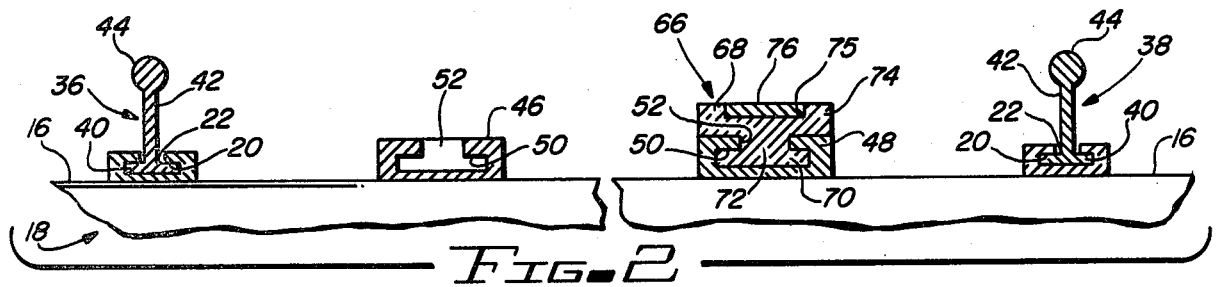

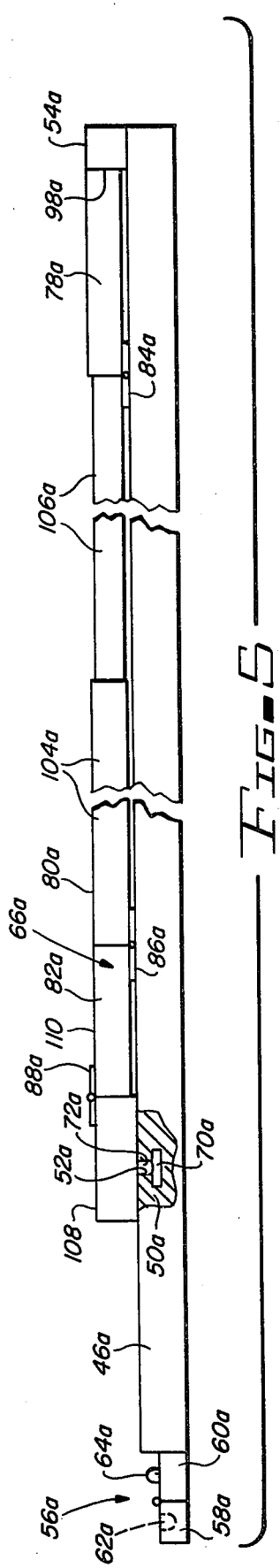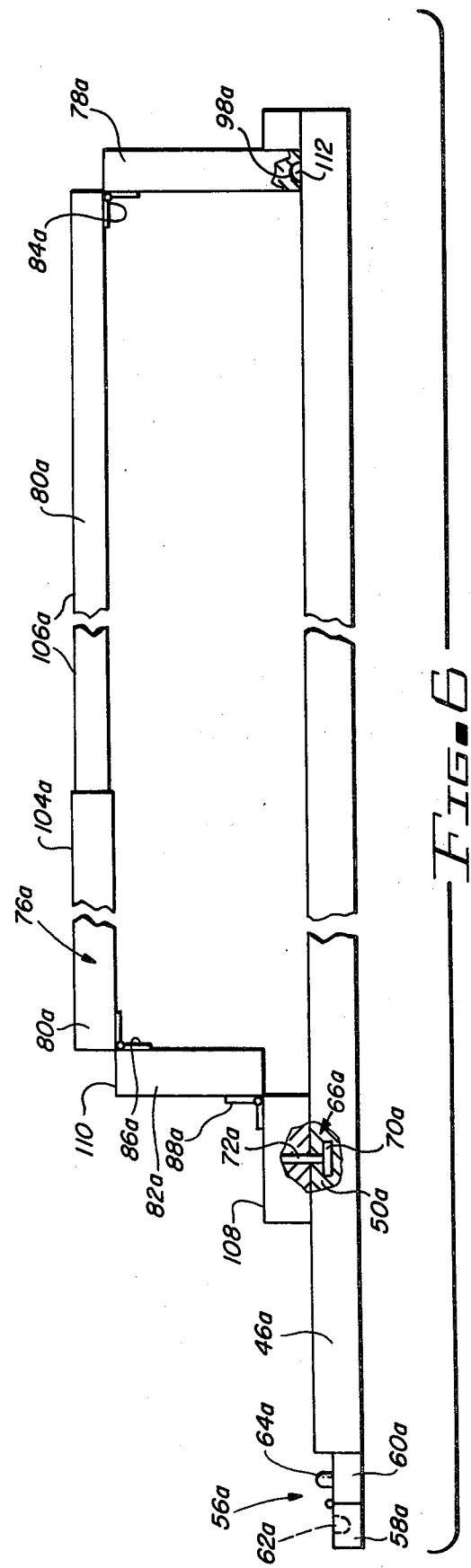

VEHICLE LUGGAGE CARRIER

BACKGROUND OF THE INVENTION

1. Field of the Invention

The present invention generally relates to luggage means and more particularly to improvements in vehicles bearing luggage carriers.

2. Prior Art

One conventional type of vehicle luggage carrier comprises a pair of spaced raised rails secured to the roof of a vehicle, between which the luggage is placed. Straps are wound over and under the luggage and rails to hold them in place. However, shifting of the luggage can easily occur. Moreover, the straps are difficult to put in place and are, at best, unsightly.

A more permanent type of luggage carrier has also been employed in the form of a metal or plastic bubble seated on the vehicle roof and secured thereto or to rails secured to the roof. This structure is expensive, bulky and provides relatively little carrying capacity. Moreover, it usually is permanently installed or is difficult enough to install and remove so as to discourage detaching it periodically. The bubble may sit high enough to provide considerable wind resistance and loss of gasoline mileage.

Various other types of luggage racks have been provided but are usually complicated and ungainly, such as the rack of U.S. Pat. No. 4,058,243 and that of U.S. Pat. No. 3,545,660 or require specialized luggage, as disclosed in U.S. Pat. No. 3,366,295, or both.

Accordingly, there is a need for a compact, simple, inexpensive luggage carrier which rests flat and out of the way when not in use so as to reduce wind resistance and yet can be easily and quickly moved into a luggage supporting position and can be used with any type of luggage. The carrier should be capable of holding securely a large amount of luggage of different types in a compact manner. Moreover, the carrier should be attractive and durable.

SUMMARY OF THE INVENTION

The present improvements in a vehicle bearing a luggage carrier satisfy all the foregoing needs. Such improvements are substantially as set forth in the foregoing Abstract. The improvements are simple, durable, attractive, easy to install, remove and use, and when not in use can be kept in place concealed and while offering little wind resistance.

As specified in the Abstract, a pair of spaced raised rails are slideably disposed in tracks secured to a vehicle surface. Between the rail tracks are disposed a spaced pair of rack sub assemblies comprising a pair of spaced rack tracks and a pair of luggage retainers slideably disposed on the rack tracks. The lower portion of each retainer is keyed to the associated rack tracks while the upper portion of the retainer is in the form of a longitudinally extending series of plates transversely hinged together. One end of the plate series is hinged or pivoted to the lower portion so that the plates lie flat against the lower portion when not in use, held in place by detents, and then can be raised to a hollow box-like or inverted U-shaped form above the lower portion encircling luggage therebetween when it is desired to use the same.

The free end of the plates is then releasably locked to the lower portion so the rack after telescoping the middle portion of the plates. In one embodiment the upper portions can be pivoted horizontally to bridge the space between the rack tracks and so as to connect to both lower portions or rack tracks. The tracks can also be provided with end locks and other accessories. Further features are as set forth in the following detailed description and accompanying drawings.

BRIEF DESCRIPTION OF THE DRAWINGS

FIG. 1 is a schematic top plan view, partly broken away, of a first preferred embodiment of the improved luggage rack assembly of the present invention;

FIG. 2 is a schematic front elevation, partly broken away of the assembly of FIG. 1;

FIG. 5 is a schematic fragmentary side elevation of one of the sub assemblies of the assembly of FIG. 4, shown in the collapsed storage position, and, FIG. 6 is a schematic side elevation of the sub assembly of FIG. 5 shown with the upper luggage retaining portion thereof in the raised operative position before pivoting to bridge the space between the two assemblies of FIG. 4.

BRIEF DESCRIPTION OF THE DRAWINGS

FIGS. 1-3

Figure 3:
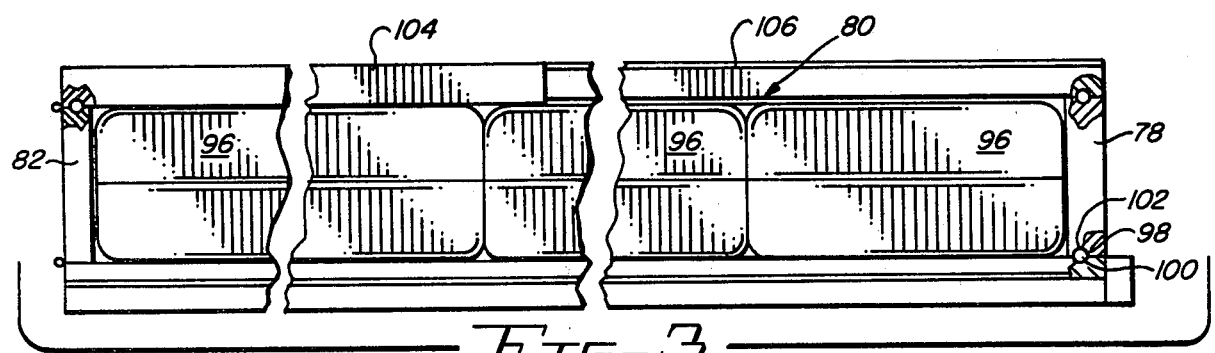
FIG. 3 is a schematic side elevation, partly broken away one of the rack sub assemblies of the assembly of FIG. 1, shown with the upper luggage retaining portion thereof in the extended operative luggage retaining position around a set of luggage.

A first preferred embodiment of the improved luggage rack assembly representing the improvements of the present invention is schematically depicted in FIGS. 1-3, inclusive. Thus, assembly 10 is shown in FIG. 1 in schematic top plan view. Assembly 10 comprises a pair of elongated flat, horizontal rail tracks 12 and 14 disposed parallel to each other in spaced relation and secured to the horizontal upper surface (roof) 16 of a vehicle 18. Preferably tracks 12 and 14 run lengthwise of surface 16. Tracks 12 and 14 each define a generally rectangular (in transverse cross-section) central channel 20 disposed along the length thereof and including a narrow upper access slot 22. The rear end of each track 12 and 14 is closed, as by a wall 24 while the front end of each track 12 and 14 is fitted with a closure 26 in the form of a pair of plates 28 and 30 hinged together and bearing a male locking member 32 (plate 28) and a female locking member 34. Plates 28 and 30 are mateable to each other by hingedly pivoting plate 28 to lie on top of plate 30. Each plate 28 and 30 alone is of insufficient thickness to block channel 20, but when plate 28 is on plate 30 their combined thickness blocks channel 20.

Raised rails 36 and 38 are slideably disposed in, respectively, tracks 12 and 14. Each of rails 36 and 38 comprises a lower foot 40 received in channel 20, a raised post 42 connected at its lower and to foot 40 and extending up through slot 22 and an upper guard bar 44 connected to the upper end of post 42. Foot 40, post 42 and bar 44 may, for example, extend the length of channel 20.

A pair of elongated rack tracks 46 and 48, substantially similar in construction to tracks 12 and 14, are disposed in spaced parallel relation to each other and tracks 12 and 14 and between tracks 12 and 14, as shown in FIG. 1 and are secured to surface 16, as by screws 49. Tracks 46 and 48 each include a central channel 50, and upper access slot 52, along with a rear end wall 54 and front closure 56 similar to closure 26. Closure 56 comprises a pair of plates 58 and 60 hinged together and bearing male and female locking members 62 and 64, as with closure 26. Plate 58 is pivotable into locking position on top of plate 60 to close the front end of channel 50.

Within each channel 50 is slideably received an elongated horizontal luggage retainer 66. In FIGS. 1 and 2 only the retainer 66 in track 48 is shown, the other retainer (66) having been removed to show track 46 more clearly. Retainer 66 in each instance comprises a base portion 68 which includes a foot 70 received in channel 50 and a post 72 connected to foot 70 and extending up through slot 52 to merge into a U-shaped receiver 74 bearing a central open topped channel 75.

Within channel 75 is disposed a luggage-retaining portion 76 comprising three longitudinally extending plates 78, 80 and 82 connected end to end by transverse hinges 84 and 86 (FIG. 1). Front plate 82 is also hingedly connected to receiver 74 by hinge 88. Plates 78, 80 and 82 are releasably held in the flat, horizontal storage position in channel 75 by spring biased balls 90 spaced along the sides of receiver 74 and releasably received in semi-circular cavities 92 in plates 78, 80 and 82 (FIG. 1).

When it is desired to raise plates 78, 80 and 82 into the operative luggage retaining position, plate 78 is first pried up by pressure exerted through finger hole 94 therein to pop balls 90 from cavities 92 in plate 78, after which plate 78 is further lifted to free plates 80 and 82. Plates 78, 80 and 82 are then pivoted to the fully up and around luggage 96 (FIG. 3) to encircle it, whereupon plate 78 is angled down to releasably lock its free end 98 into the rear portion of receiver 74, as by forcing a spring biased ball 100 in receiver 74 into a cavity 102 in end 98.

It will be noted that in the operative position plates 78 and 82 are about vertical while plate 80 is horizontal and spaced above receiver 74. It will also be noted that plate 80 comprises two telescoping sections 104 and 106 so that in the operative position plate 80 can extend substantially the full length of receiver 74, as shown in FIG. 1, to accommodate a considerable number of items of luggage 96.

With both sets of plates 78, 80 and 82 in the operative position and with rails 36 and 38 in place, luggage 96 encircled by the two sets of plates 78, 80 and 82 and lying on both receivers 74 is prevented from sliding out therefrom because of rails 36 and 38. This arrangement thus firmly, easily and conveniently holds luggage 96 in place, and can be very easily moved between the flat low wind resistance storage position for plates 78, 80 and 82 and the operative luggage holding position of FIG. 3. Assembly 10 can be made inexpensively and durably of conventional metals, such as aluminum, stainless steel and the like and can be easily installed on surface 16. Moreover, luggage retainers 66 and rails 36 and 38 can be easily placed in their respective rails and locked in place and just as easily removed therefrom, as the occasion demands. Assembly 10 is attractive, convenient and of low profile.

FIGS. 4–6

Figure 4:
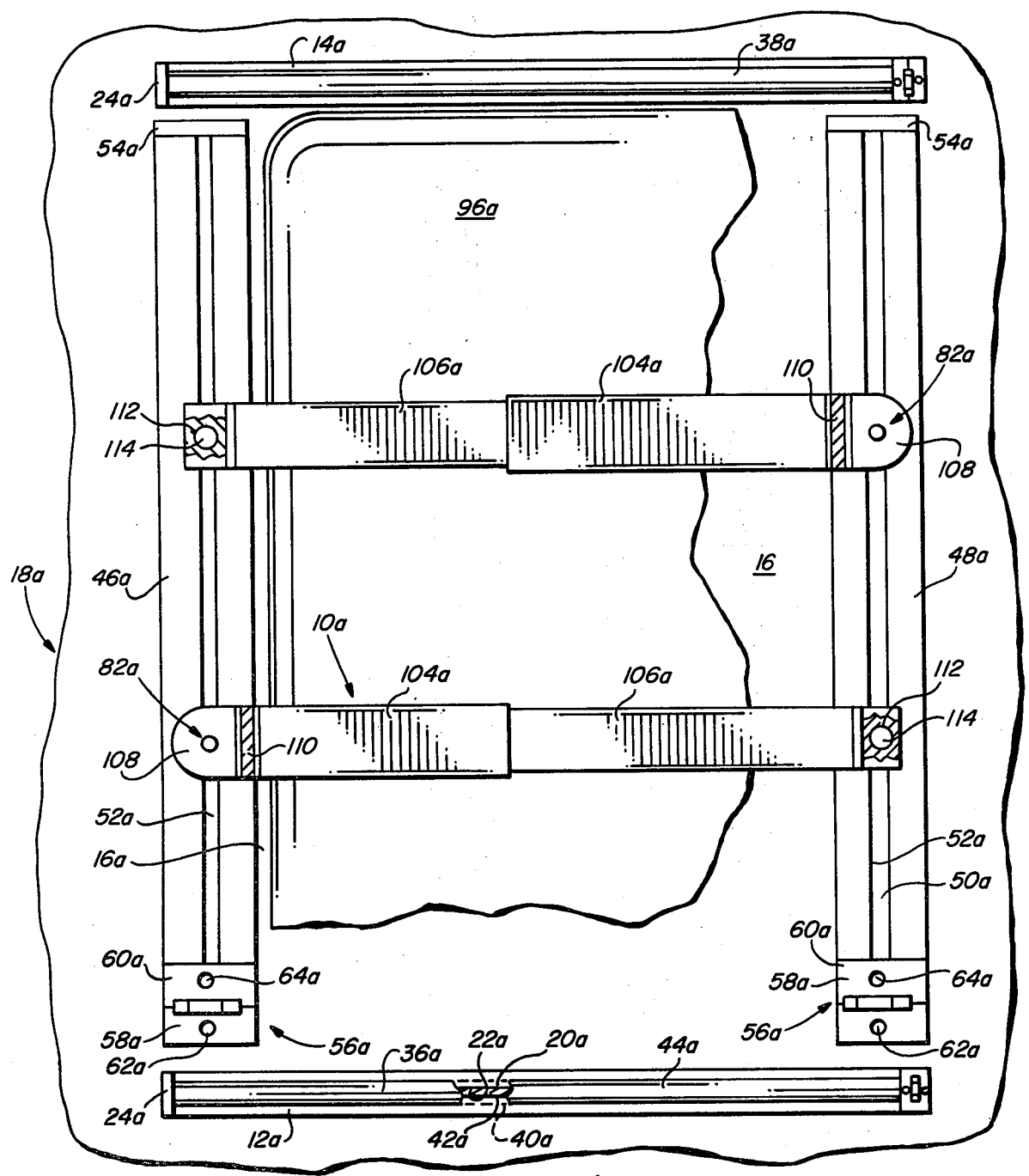
FIG. 4 is a schematic top plan view, partly broken away of a second preferred embodiment of the improved luggage rack assembly of the present invention, shown in the operative position.

A second preferred embodiment of the improved rack assembly comprising the improvements of the invention is schematically depicted in FIGS. 4–6, inclusive. Thus, assembly 10a is shown, which is generally similar to assembly 10. Components of assembly 10a generally similar to those of assembly bear the same numerals but are succeeded by the letter "a".

Thus, assembly 10a includes a pair of elongated horizontal rail tracks 12a and 14a similar in construction to tracks 12 and 14 and secured in parallel spaced relation and each other an roof 16a of vehicle 78a. Each of tracks 12a and 14a includes a channel 20a having an upper slab 22a, rear end wall 24a and front closure 26a comprising plates 28a and 30a with locking members 32a and 34a. Rails 36a and 38a are disposed in tracks 12a and 14a and each includes a foot 40a, post 42a and upper guard bar 44a.

Assembly 10a also includes a pair of spaced, elongated, horizontal, parallel rack tracks 46a and 48a disposed at right angles to tracks 12a and 14a and adjacent opposite ends thereof (see FIG. 4). Tracks 46a and 48a are similar to tracks 46 and 48 and each includes a channel 50a with slot 52a. A raised rear wall 54a is provided, blocking channel 50a. A front closure 56a is provided having plates 58a and 60a with locking members 62a and 64a.

A luggage retainer 66a is keyed to channel 50a through slot 52a. Retainer 66a includes a circular foot 70a in channel 50a and a narrow cylindrical post 72a passing up through slot 52a to a moveable luggage holding portion 76a. Portion 76a comprises articulated plates 78a, 80a and 82a connected end to end by transverse hinges 84a and 86a and lies on the top of track 46 (or track 48), connected thereto by foot 70a and post 72a. Plate 82a comprises 2 sections, 108 and 110 hinged end to end by hinge 88a. Section 108 is pivotably connected to post 72a, while section 110 is moveable between the horizontal sorted position of FIG. 5 and the operative position of FIG. 6. Plate 80a comprises 2 telescoping sections 104a and 106a. The free end 98a of plate 78a includes a cavity 112 adopted to receive a spring biased ball 114 disposed in and secured to slot 52a.

When it is desired to use assembly 10a to hold luggage, such luggage is placed on roof 16a between tracks 46a and 48a and between rails 36a and 38a. Then section 108 and the remainder of attached plates 78a, 80a and 82a are then pivoted in a horizontal plane to a position at a right angle to tracks 46a and 48a after section 110 and plate 78a are then angled up to the vertical and section 80a is telescoped to bridge the space over such luggage between tracks 46a and 48a. Plate 78a, specifically end 98a is then locked through cavity 112 to ball 114, so that assembly 10a is placed in the luggage supporting mode shown in FIGS. 4 and 6 encircling luggage 96a.

The space 116 defined between rails 36a and 38a and encircled by plates 78a, 80a and 82a and tracks 46a and 48a can be filled with luggage 96a, such luggage being easily and securely supported in place on vehicle 18a.

When it is desired to remove luggage 96a, ends 98a can be disengaged from balls 114 and plates 78a, 80a and 82a can be swung up and away from luggage 96 in space 116. Luggage 96a then can be easily removed from assembly 10a. Plates 78a, 80a and 82 can then be easily stored on tracks 46a and 48a between closures 26a and rear walls 24a or, if desired, can be removed from tracks 46a and 48a, as can rails 36a and 38a from tracks 12a and 14a. Thus, assembly 10a is simple, inexpensive, durable and efficient.

Various modifications, changes, alterations and additions can be made in the improvements of the present invention, their parameters and components. All such changes, modifications, alterations and additions as are within the scope of the appended claims form part of the present invention.

What is claimed is:

1. In a vehicle having a luggage supporting surface and a luggage carrier means connected thereto, the improvement which comprises a luggage rack assembly comprising, in combination:
   (a) a spaced parallel pair of longitudinally extending raised side rails slideably disposed in parallel rail tracks secured to said luggage supporting surface; and,
   (b) a spaced parallel pair of longitudinally extending sub-assemblies disposed between said side rails, each said sub assembly comprising, in combination,
      i. an elongated rack track,
      ii. an elongated luggage retainer keyed to said rack track having a portion thereof moveable between a collapsed flat storage position generally parallel to said rack track and an operative raised luggage engirdling position spaced above said rack track.

2. The improvements of claim 1 wherein said luggage retainer is slideably secured to said rack track and includes a first portion moveable between said collapsed and operative positions, and a second fixed portion abutting said first portion.

3. The improvements of claim 2 wherein said second section abuts the sides and bottom of said first portion and wherein locking means releasably lock said first portion to said second portion.

4. The improvements of claim 2 wherein said first portion includes a plurality of longitudinally extending plates hinged together by transverse hinges, at least one of said plates including telescoping sub sections.

5. The improvements of claim 4 wherein said plates include first and second end plates at opposite ends of said first portion and moveable between an operative about vertical luggage support position and a collapsed storage position, said second end plate being hinged to said second portion, and a third plate hingedly secured to the free ends of said first and second end plates and including said telescoping sub sections, said third plate in said operative position being generally parallel to and spaced above said second portion.

6. The improvements of claim 5 wherein said third plate is extendable in length to abut the length of said rack track.

7. The improvements of claim 6 wherein said tracks, rails and said first portion in a collapsed storage position are horizontal.

8. The improvements in claim 1 wherein said rail tracks and said rack tracks include stop means to releasably secure, respectively, said rails and said racks in said tracks.

* * * * *